J. O. STIVERS.
CORN AND BUNION EASING ATTACHMENT FOR BOOT AND SHOE LASTS.
APPLICATION FILED SEPT. 18, 1907.
12,881. Reissued Nov. 17, 1908.
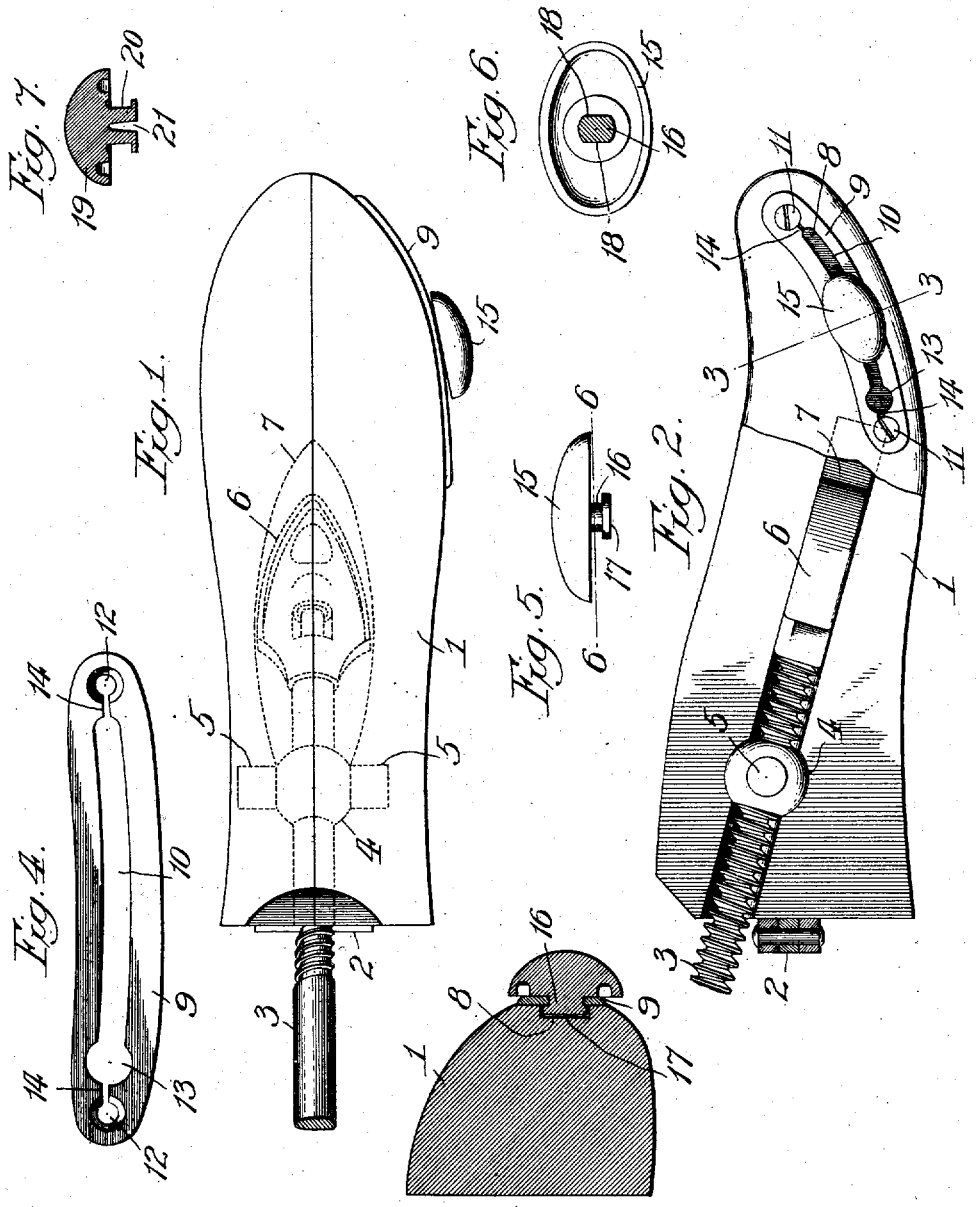
Witnesses:
Geo. Taylor,
John Endere.
Inventor:
John O. Stivers,
By Sheridan & Wilkinson,
Attys.
THE NORRIS PETERS CO., WASHINGTON, D. C.

UNITED STATES PATENT OFFICE.

JOHN O. STIVERS, OF DENVER, COLORADO, ASSIGNOR TO THE PERFECT SHOE STRETCHER COMPANY.

CORN AND BUNION EASING ATTACHMENT FOR BOOT AND SHOE LASTS.

No. 12,881. Specification of Reissued Letters Patent. Reissued Nov. 17, 1908.

Original No. 838,146, dated December 11, 1906, Serial No. 293,367. Application for reissue filed September 18, 1907. Serial No. 393,580.

*To all whom it may concern:*

Be it known that I, JOHN O. STIVERS, a citizen of the United States of America, residing in the city and county of Denver and State of Colorado, have invented new and useful Corn and Bunion Easing Attachments for Boot and Shoe Lasts, of which the following is a specification.

My invention relates to improvements in corn and bunion easing attachments for boot and shoe lasts.

The objects of the invention are to provide a removable lug or button which may be adjustably attached to either side of a last and which when adjusted to the desired position will be held against accidental displacement; further, to provide the last with means whereby the button may be easily and quickly adjusted and which admits of the last being used for general stretching purposes when the button is removed. These objects are attained by the device illustrated in the accompanying drawings, in which—

Figure 1 is a plan view of a two-part last, provided with the usual spreading device and with my improved corn and bunion easing attachment. Fig. 2 is a side elevation thereof, showing my improvement applied thereto, a portion of one of the members of the last being broken away to show the spreading mechanism. Fig. 3 is a sectional view through one member of the last on the line 3, 3 of Fig. 2, illustrating the manner of attaching the button. Fig. 4 is a face view of the spring-button clamp. Fig. 5 is a side elevation of the button. Fig. 6 is a sectional view through the shank of the button on the line 6, 6 of Fig. 5, and Fig. 7 is a sectional view illustrating a modification of the button.

Similar numerals of reference refer to similar parts throughout the several views.

Referring to the accompanying drawings, the numeral 1 refers to the last, which is a two-part last of the usual type, the members of which are hinged at the rear or heel end by a hinge 2. The last is provided with a spreading device, which is of the type in general use and comprises a threaded rod 3, which passes through a spherical nut 4, having trunnions 5, which are supported in oppositely-arranged apertures in the two members of the last. The forward end of this rod is provided with a swiveled wedge 6, which lies in a wedge-shaped recess 7, formed in the two members of the last, and by turning the rod the wedge is moved forward in the recess 7 to spread the members of the last apart. This spreading device, however, forms no part of my invention, and further reference to it is unnecessary.

In one or both sides of the last is formed a recess 8 of suitable length, and over this recess is secured a plate 9, having a slot 10, which is of the same length as the recess in the last, but of slightly less width, the plate being secured at each end to the last by screws 11, which pass through countersunk holes 12. (Clearly shown in Fig. 4.) One end of the slot widens out to form a substantially circular entrance 13, and slits 14 connect the ends of the slot and the screw-holes 12. This construction of the plate allows its two members to be sprung apart for a purpose to be presently specified. Within the slot 10 of the plate 9 is secured a button 15, which when the last is in operative position in a boot or shoe is designed to expand or stretch the leather immediately over it. This button is preferably elliptical in contour, while its outer surface, or that portion which comes in contact with the boot or shoe, is oval in form.

An integral shank 16 projects centrally from the inner face of the button, having a circular disk-like head 17 at its outer end, which is of a size to fit easily within the entrance-opening 13 at one end of the slot in the plate 9, but of greater diameter than the width of the slot. The shank 16 of the button is of slightly greater diameter than the width of the slot, and opposite sides of this shank, preferably the sides in line with the long diameter of the button, are flattened sufficiently, as shown at 18, to make the diameter of the shank between its flattened sides the same width or just a trifle narrower than the slot 10, so that in one position relative to the plate 9 the button may be freely moved either backward or forward in the slot.

When it is desired to insert the button in the slot of the plate 9 for the purpose of stretching a particular portion of a boot or shoe, the button is turned so that its long diameter will lie at right angles to the length of the plate, and in this position the head 17 is inserted in the opening 13 at one end of the slot and the button moved to the desired position in the slot, the flat sides of the shank of the button when in this position being parallel with the sides of the slot. When the button has been moved along the slot to the desired point, it is given a quarter-turn, so as to lie in the position shown in Fig. 2, when the portion of the shank of greatest diameter will contact forcibly with the sides of the slot and spring the members of the plate apart, thus causing them to impinge upon the shank with sufficient pressure to hold the button in the desired position. The last is then placed in the boot or shoe and the stretching process accomplished by the mechanism hereinbefore described. Then by giving the button a quarter-turn it may be moved along the slot and removed therefrom through the opening 13.

While I preferably use a spring-plate and the style of button described, I may employ a button 19 of the style shown in Fig. 7, in which the shank 20 has a central slot 21, which allows the two members thus formed to be sprung apart. With this form of button a plate similar to that described in the foregoing specification would be used, but its members would be secured to the last in such manner as to prevent their being sprung apart. The button would then be held at a predetermined position in the slot by giving it a quarter-turn, which would compress the two members of the slotted shank between the edges of the slot, thereby causing the button to be held by friction in contact with the plate, as in the former case.

When the button is removed from the last, the last may be used for general stretching purposes.

Having described my invention, what I claim as new, and desire to secure by Letters Patent, is—

1. In a device of the character described, the combination with a last, of a slotted plate secured upon the forward portion thereof, a projecting button adjustable in said slot, and means whereby the button may be held at a predetermined point.

2. In a device of the character described, the combination with a last, of a slotted plate secured thereto, a button having a shank which slides in the slot, and a flange on the end of the shank.

3. In a device of the character described, the combination with a last, of a resilient metal plate secured thereto, having a longitudinal slot, which is enlarged at one end, a button having a flanged shank movable in said slot in one position of the button, which is flattened on opposite sides to correspond to the width of the slot, and which is held frictionally by the sides of said slot, when the button is turned a predetermined distance.

4. In a device of the character described, the combination with a last, having a longitudinal groove, of a resilient metal plate secured to said last, having a slot enlarged at one end, which lies above, and parallel, with said groove, and which is narrower than the groove, a button adapted to be movably secured to said plate, having a shank which extends through said slot, said shank being of greater diameter than the width of the slot, but flattened on opposite sides, to fit within, and move freely in the slot, and a flange on the end of the shank, which fits in the groove of the last, and contacts with the inner side of the plate, said button being held in a predetermined position, by turning it to cause the portion of its shank of greater diameter to expand the plate laterally, thereby causing the sides of the groove to impinge upon the shank.

5. In a device of the character described, the combination with a last, of a resilient slotted plate secured at each end to the last, a button, having a flanged shank which fits in said slot, said shank being of greater diameter than the width of the slot, but flattened on opposite sides to coincide with the width of the slot, said button being held at a predetermined point in the slot, by turning it to cause the portion of its shank of greater diameter to expand the plate laterally, thereby causing the sides of the groove to impinge upon the shank.

6. In a device of the character described, the combination with a last having a resilient, slotted plate secured thereto, so as to be laterally expansible, of a button having a flanged shank, which is flattened on opposite sides to coincide with the width of said slot, but otherwise of greater diameter than the slot, said button being movable in said slot, when its flattened sides lie parallel with the sides of the slot, and locked in said slot when turned to bring the portion of the shank of greater diameter in frictional contact with the sides of the slot.

7. In a device of the character described, the combination of a last, a button thereon, and means permitting the movement of the button along the last to adjust the position of the button.

8. In a device of the character described, the combination of a last, a button secured thereto, and means permitting the movement of the button along the last to adjust the position of the button.

9. In a device of the character described, the combination of a last, a button detachably secured thereto, and means permitting the movement of the button along the last to adjust the position of the button.

10. In a device of the class described, the combination of a last, a guide thereon, and a button movably engaging the guide.

11. In a device of the class described, the combination of a last, a guide thereon, and a button detachably secured to the guide and movable therein to adjust the position of the button.

JOHN O. STIVERS.

Witnesses:
VERNE COATES,
J. B. MONROE.